United States Patent [19]

Kuroda et al.

[11] Patent Number: 5,082,900

[45] Date of Patent: Jan. 21, 1992

[54] OPACIFIED MOLDED PRODUCT

[75] Inventors: Takashi Kuroda; Kazuhiro Yamada; Tadao Ishibashi; Suetou Hayashida; Kyoichiro Kimura; Masaru Sameshima, all of Chiba, Japan

[73] Assignees: Chisso Corporation; Maruzen Petrochemical Co., Ltd., both of Japan

[21] Appl. No.: 499,630

[22] Filed: Mar. 27, 1990

[30] Foreign Application Priority Data

Mar. 29, 1989 [JP] Japan .................... 1-74919
Mar. 31, 1989 [JP] Japan .................... 1-78293

[51] Int. Cl.$^5$ .............. C08L 23/12; C08L 45/00; C08L 25/10; C08J 5/18
[52] U.S. Cl. .................... 525/211; 525/192; 524/518
[58] Field of Search .................... 525/211, 192

[56] References Cited

U.S. PATENT DOCUMENTS

| | | | |
|---|---|---|---|
| 3,663,488 | 5/1972 | Kail | 525/210 |
| 4,230,767 | 10/1980 | Isaka et al. | 428/439 |
| 4,615,941 | 10/1986 | Lu | 428/327 |
| 4,615,942 | 10/1986 | Lu | 428/327 |
| 4,927,885 | 5/1990 | Hayashida et al. | 525/211 |

FOREIGN PATENT DOCUMENTS

| | | |
|---|---|---|
| 3144911 | 5/1983 | Fed. Rep. of Germany . |
| 47-15444 | 8/1972 | Japan . |
| 49-18472 | 5/1974 | Japan . |
| 57-192447 | 11/1982 | Japan . |
| 59-68340 | 4/1984 | Japan . |
| 60-163949 | 8/1985 | Japan . |
| 63-035642 | 2/1988 | Japan . |
| 63-24532 | 5/1988 | Japan . |
| 63-117043 | 5/1988 | Japan . |
| 63-168441 | 7/1988 | Japan . |

*Primary Examiner*—Carman J. Seccuro
*Attorney, Agent, or Firm*—Leydig, Voit & Mayer

[57] ABSTRACT

The present invention relates to an opacified molded product composed mainly of a polypropylene resin. More particularly, according to the present invention, there are provided an opacified stretched molded product having a total light transmittance of 50% or less and a density of 0.89 or less comprising a composition comprising 100 parts by weight of polypropylene and 3 to 40 parts by weight of a cyclopentadiene petroleum resin and/or a hydrogenated cyclopentadiene petroleum resin, the molded product being a product stretched in at least one direction. Also provided are a resin composition comprising 100 parts by weight of a crystalline polypropylene and 30 to 40 parts by weight of a copolymer resin comprising a copolymer of a cyclopentadiene compound and an aromatic hydrocarbon or its hydrogenated product, a stretched molded product thereof.

12 Claims, No Drawings

OPACIFIED MOLDED PRODUCT

BACKGROUND OF THE INVENTION

1. Field of the Invention:

The present invention relates to an opacified molded product composed mainly of a polypropylene resin. More particularly, it relates to an opacified molded product and a process for producing a stretched and molded product having a feeling of opacity or pearly quality imparted by stretching a molded product of a composition comprising a specified amount of a cyclopentadiene petroleum resin and/or its hydrogenated product blended with a crystalline polypropylene; and a process for producing the same, a composition for a specified stretched molded product comprising a specified amount of a copolymer resin comprising a copolymer of a cyclopentadiene compound and an aromatic hydrocarbon and/or its hydrogenated product with a crystalline polypropylene, an opacified stretched and molded product prepared by stretching the molded product of the composition; and a process for producing the same.

2. Description of the Prior Art:

Molded products having a feeling of pearl or opacity generally have been used as containers and also for general packaging materials, decorative materials, synthetic paper, transcription printing paper or the like, e.g., in the form of a uniaxially or biaxially stretched film. Further, they have been widely used for packing materials, weaving yarns, etc. in the form of a tape, a ribbon or a filament.

Examples of methods of producing a molded product having a feeling of opacity or pearly quality known in the art include (1) a method wherein a brightening agent, such as white pigment, extender pigment or pearl essence, is added, (2) a method wherein a foaming agent is added during molding to form a number of cells, (3) a method as described in Japanese Patent Publication No. 24532/1988 and Japanese Patent Laid-Open No. 117043/1988 wherein a large amount of an inorganic filler is added and the mixture is stretched to form voids, and (4) a method wherein a molded product is treated with a solvent, chemicals or the like to dull the molded product.

The above-described methods have the following drawbacks. Specifically, in method (1), it is necessary to use proper pigments respectively for imparting the feeling of opacity or pearly quality, and further the pearl essence is very expensive. Moreover, it is necessary to use a mixing method and apparatus to which particular consideration has been given for the purpose of improving the dispersibility of the above pigments. Method (2) has drawbacks such as the necessity to select the foaming agent to be used depending upon the molding conditions and the applications of the molded product, and the difficulty of forming uniform and fine cells when a thin membrane such as a film is formed. In method (3), addition of a large amount of an inorganic filler brings about many troubles during production of the molded material, such as a remarkable lowering of flowability during extrusion, occurrence of clogging of a screen pack, high susceptibility to moisture absorption, foaming and poor dispersion attributable to the use of the inorganic filler, and the necessity of a long period of time for purging resins in the molding machine. Further, in this method, only molded products having lowered glossiness and a roughened or rough surface are prepared. In method (4), the treatment is conducted in a post-treatment step, and it is necessary to remove the solvent and chemicals, which is disadvantageous from the viewpoint of apparatus and cost. Further, in this method, although a molded product having a feeling of dullness can be prepared, no molded product having a pearly feeling, can be prepared.

SUMMARY OF THE INVENTION

An object of the present invention is to eliminate the above-described drawbacks of the prior art and to provide a stretched and molded product having excellent opacity and pearlesence, light weight and high gas permeability and a composition for easily producing said stretched molded product. Another object of the present invention is to provide a process for producing an opaque stretched and molded product which is free from problems on production, such as nonuniform foaming and poor dispersion.

The present invention relates to:

(1) an opacified, stretched molded product having a composition comprising 3 to 40 parts by weight of a cyclopentadiene petroleum resin and/or a hydrogenated cyclopentadiene petroleum resin having a softening point of 160° C or higher as measured according to the ring and ball method, and 100 parts by weight of a crystalline polypropylene, the molded product being a product stretched in at least one direction, and having a total light transmittance of 50% or less and a density of 0.89 g/cm$^3$ or less;

(2) a process for producing a stretched molded product which comprises preparing a raw sheet by melt extrusion of a composition comprising 100 parts by weight of a crystalline polypropylene and 3 to 40 parts by weight of a cyclopentadiene petroleum resin and/or a hydrogenated cyclopentadiene petroleum resin having a softening point of 160° C or higher as measured according to the ring and ball method and stretching the raw sheet to twice its dimensions or more in at least one direction at a temperature not higher than the softening point of the petroleum resin;

(3) a crystalline polypropylene resin composition comprising 100 parts by weight of a crystalline polypropylene and 3 to 40 parts by weight of a copolymer resin of a cyclopentadiene compound and an aromatic hydrocarbon and/or its hydrogenated product, wherein the copolymer resin and its hydrogenated product have a softening point of 160° to 250° C as measured according to the ring and ball method;

(4) a crystalline polypropylene resin composition according to the above item (3), wherein the hydrogenated product of said copolymer resin has a softening point of 165° to 200° C. as measured according to the ring and ball method and a maximum absorbance of 0.01 to 0.5 at 265 to 276 nm in an ultraviolet absorption spectrum thereof; and (5) a stretched and molded product and a process for producing the same, wherein the crystalline polypropylene resin composition according to the above item 3 or 4 is stretched in at least one direction.

DETAILED DESCRIPTION OF THE INVENTION

The crystalline polypropylene used in the present invention is a homopolymer of propylene, a copolymer of propylene as a major component with another α-olefin, or a mixture thereof.

Examples of the cyclopentadiene petroleum resin used in the present invention include a cyclopentadiene petroleum resin prepared by thermally polymerizing a fraction composed mainly of cyclopentadiene, dicyclopentadiene and its polymer or alkyl substitution products thereof or mixtures thereof obtained by steam cracking of petroleum naphtha and the like, in the presence or absence of a solvent in an inert gas atmosphere, such as nitrogen gas and the like, at a temperature of preferably 220° to 320° C. for several hours or longer under a pressure at least sufficient to maintain the polymerization system in a liquid state; a hydrogenated cyclopentadiene resin prepared by hydrogenating said petroleum resin by the conventional method known in the art, i.e., by using a catalyst comprising a metal, such as palladium, nickel, cobalt and the like or its oxide and the like, in the presence of a solvent at a temperature of 150° to 300° C. under a hydrogen pressure of 10 to 150 kg/cm$^2$. It is a matter of course that the above-described cyclopentadiene fraction may include diolefins such as butadiene, isoprene, piperylene and the like and monoolefins such as butene, pentene and the like. The polymerization of the cyclopentadiene fraction may be conducted in one stage. Alternatively, the polymerization may be conducted in two or more stages, for example, in two stages. The step of polymerization and the steps of polymerization and hydrogenation may be conducted in either a continuous manner or a batch manner.

Among the cyclopentadiene petroleum resins thus prepared, a cyclopentadiene petroleum resin having a softening point (as measured according to the ring and ball method) of 160° C. or higher is used in the present invention. When the softening point is below 160° C., both the feelings of opacity and pearlesence are insufficient, which makes it impossible to prepare a stretched and molded product attempted in the present invention. On the other hand, when the softening point is 150° C. or lower, as with Japanese Patent Laid-Open No. 203140/1986 and the conventional hydrogenated petroleum resins, the petroleum resin exhibits a tendency opposite to the object of the present invention, i.e., a tendency to improve the transparency and the barrier property, so that it is impossible to prepare a very characteristic stretched and molded product attempted in the present invention which is opaque, has fine cells and is permeable to gas.

In the present invention, a hydrogenated cyclopentadiene petroleum resin having a softening point of 160° C. or higher is preferred, and a hydrogenated cyclopentadiene petroleum resin having a softening point of 170° to 200° C. and an iodine value of 20 or less is particularly preferred because it is possible to prepare a stretched and molded product which is excellent in the compatibility with polypropylene, can be stably worked and has excellent whiteness and opacity.

The composition of the present invention comprising a cyclopentadiene petroleum resin blended with a crystalline polypropylene comprises 100 parts by weight of a crystalline polypropylene and 3 to 40 parts by weight of a cyclopentadiene petroleum resin and/or a hydrogenated cyclopentadiene petroleum resin having a softening point of 160° C. or higher or their mixture (hereinafter referred to simply as "cyclopentadiene petroleum resin"). When the amount of addition of the cyclopentadiene petroleum resin is less than 3 parts by weight, the effect of imparting opacity attempted in the present invention is insufficient. On the other hand, when the amount exceeds 40 parts by weight, nonuniform extrusion and breaking by stretching are liable to occur during molding, which unfavorably brings about a remarkable lowering in the productivity.

In order to prepare an opacified stretched and molded product having excellent productivity it is particularly preferred to add a hydrogenated product of the cyclopentadiene petroleum resin having a softening point of 170° to 200° C. in an amount of 5 to 30 parts by weight to 100 parts by weight of a crystalline polypropylene.

The composition comprising a crystalline polypropylene and a cyclopentadiene petroleum resin used in the present invention may be optionally added to various conventional additives commonly used for addition to polypropylene, for examples, processing stabilizers, antioxidants, lubricants, slipping agents, antistatic agents, various other polymers and the like.

The composition may be easily prepared by mixing in a usual blender, mixer or the like. However, it is particularly preferred that the composition is prepared by melt kneading in an extruder, a Banbury mixer or the like and used in the form of pellets. Further, it is also useful to employ a method which comprises adding a large amount of the cyclopentadiene petroleum resin to polypropylene or other resin to prepare a master batch and blending a specific amount of the master batch with polypropylene to prepare a mixed composition.

The composition thus prepared is subjected to melt extrusion to prepare a raw sheet, and the raw sheet is uniaxially or biaxially stretched to prepare a stretched molded product having a feeling of opacity or pearlesence attempted in the present invention.

The stretching may be conducted by any of known uniaxial stretching methods, such as roll stretching, oven stretching and hot plate stretching, or simultaneous or successive biaxial stretching, such as tubular stretching and tenter stretching. In this case, it is necessary to make the raw sheet temperature during stretching below the softening point of the cyclopentadiene petroleum resin contained in the composition used. Selection of this condition enables an opacified stretched and molded product having a total light transmittance of 50% or less and a density of 0.89 or less to be prepared.

In the stretching etc. in an oven, the hot air temperature is sometimes set at or higher than the melting temperature of polypropylene. However, it is impossible to conduct stretching and orientation of polypropylene raw sheet at or higher than the melting temperature of polypropylene. In this case, the actual temperature of the stretched raw sheet does not reach the melting temperature due to the relationship between the heat conduction, the thickness of the stretched raw sheet and the passing speed thereof. In the present invention, the actual temperature of the stretched raw sheet is regarded as the stretching temperature.

The stretched and molded product attempted in the present invention can be prepared by stretching the raw sheet twice its dimension or more in at least one direction at a stretching temperature corresponding to the softening point or lower of the cyclopentadiene petroleum resin used in the composition. Stretching to at least four times its dimension in terms of the area ratio is preferred, and it is particularly preferred to conduct simultaneous or successive biaxial stretching wherein the raw sheet is stretched to an area ratio as high as about 10 to 60. The stretching ratio of the stretched and molded product may be determined by measuring and calculating the difference between the refractive index in either the longitudinal direction or lateral direction and that of the thickness direction of stretched molded product of polypropylene per se, and the standard of the stretching ratio is preferably at least $500 \times 10^{-4}$, i.e., (refractive index in longitudinal or lateral direction − refractive index in thickness direction) $\geq 500 \times 10^{-4}$.

When the composition composed of a cyclopentadiene petroleum resin and a crystalline polypropylene is molded as it is without stretching, only a slightly opaque and semitransparent molded product having slightly lowered transparency is prepared and the density of the molded product becomes higher than that of the molded product of polypropylene per se, so that the molded product attempted in the present invention cannot be prepared.

The stretched and molded product containing a cyclopentadiene petroleum resin is characterized by a total light transmittance of 50% or less and a density of 0.89 g/cm³ or less. When the total light transmittance exceeds 50%, the feeling of opacity is insufficient, while when the density exceeds 0.89 g/cm³ the internal foaming is insufficient. In these cases, a stretched and molded product having a pearly feeling cannot be prepared. A stretched and molded product having a total light transmittance of 40% or less and a density of 0.89 g/cm³ or less is particularly preferred because of excellent feeling of opacity, light shielding property and pearly gloss.

If necessary, the stretched and molded product may be subjected to surface treatments such as corona and plasma treatments in an atmosphere of air, oxygen gas, nitrogen gas or the like.

In the above-described composition containing a cyclopentadiene petroleum resin, a molded product which is produced by using the composition without stretching has neither opacity nor a pearly feeling. However, when a composition comprising a crystalline polypropylene and a copolymer resin of a cyclopentadiene compound and an aromatic hydrocarbon is used, an opaque molded product can be prepared without stretching. In this case, it is also preferred to apply stretching because the feelings of opacity and pearlesence, and light shielding property can be improved.

The copolymer resin comprised of a cyclopentadiene compound and an aromatic hydrocarbon can be prepared by thermally copolymerizing a cyclopentadiene compound with an aromatic hydrocarbon. The hydrogenated product of the copolymer resin can be prepared by hydrogenating the resultant copolymer resin by an ordinary method. The copolymer resin and its hydrogenated product are hereinafter referred to simply as the "copolymer resin of the present invention".

One raw material of the copolymer resin of the present invention is a cyclopentadiene compound, and specific examples thereof include cyclopentadiene, dicyclopentadiene and its polymer or alkyl substitution products thereof or mixtures thereof. It is also possible to use a cyclopentadiene fraction containing 50% by weight or more of cyclopentadienes, obtained by steam cracking of naphtha etc. (hereinafter referred to as "CPD" fraction). A major portion of the CPD fraction other than cyclopentadiene comprises inactive saturated hydrocarbons. In some cases, the CPD fraction contains olefinic monomers copolymerizable with the above-described alicyclic olefins, e.g., aliphatic diolefins such as isoprene, butadiene and the like, and alicyclic olefins such as cyclopentene and the like. In the present invention, it is preferred for the concentration of these olefinic or diolefinic monomers to be low, and the concentration is preferably 1/10 or less in terms of weight of the cyclopentadiene compound.

Another raw material of the copolymer resin of the present invention is an aromatic hydrocarbon, and examples thereof include monovinyl aromatic hydrocarbons and/or indenes. Examples of the monovinyl aromatic hydrocarbons include styrene, vinyltoluene, α-methylstyrene, β-methylstyrene or their mixtures, and examples of the indenes include indene, methylindene, ethylindene or their mixtures. The so-called "C9 fraction" obtained as a by-product in the steam cracking of petroleum naphtha mainly comprises a mixture generally containing monovinyl aromatic hydrocarbons and indenes and is a useful raw material from the viewpoint of industry.

The above-described aromatic hydrocarbons are mixed with the cyclopentadiene compound, and the mixture is subjected to thermal polymerization in the presence or absence of a solvent, such as benzene, xylene, n-hexane, kerosene or the like at a polymerization temperature of 220° to 320° C. in an atmosphere of an inert gas, such as nitrogen gas or the like for a time period of preferably about 0.2 to 10 hr under a pressure at least sufficient to maintain the polymerization system in a liquid state. When a solvent is used, it is preferred to add the solvent in such an amount that the concentration of the raw materials of the reaction does not become about 25% by weight or less. The above-described copolymerization may be conducted in one stage. Alternatively, the copolymerization may be conducted by repeating the reaction in two or more stages. Such a series of polymerization reactions may be conducted in either a continuous manner or a batch manner.

After the thermal copolymerization is conducted in the above-described manner, the pressure of the polymerization system may be then lowered and the inactive components, unreacted raw materials, solvent, etc. contained in the raw materials may be removed to obtain a desired thermally polymerized resin.

A hydrogenated copolymer resin used in the present invention can be prepared by hydrogenating the copolymer resin thus prepared, e.g., according to a conventional hydrogenation method. The hydrogenation may be conducted by using a hydrogenation catalyst, e.g., nickel, palladium or cobalt, in the presence of a solvent such as cyclohexane and the like at a temperature of about 150° to 300° C. under a pressure of 10 to 150 kg/cm². It is preferred that the resultant hydrogenated copolymer resin has a softening point (as determined by the ring and ball method) of 165° to 200° C. and a maximum value of absorbance (hereinafter referred to as the "maximum absorbance") of an ultraviolet absorption spectrum of 0.01 to 0.5 at 265 to 276 nm.

When the softening point is below 160° C. the opacity attempted in the present invention is insufficient. When the softening point is 150° C. or lower, in the same manner as the conventional hydrogenated petroleum resins and alicyclic hydrocarbon resins, the effect of improving the transparency of a molded product of polypropylene is observed. That is, in this case, the hydrogenated copolymer resin exhibits a behavior quite opposite to that attempted in the present invention. On the other hand, it is very difficult to economically prepare a hydrogenated copolymer resin having a softening point exceeding 250° C. on a commercial scale.

Further, dispersion of such a hydrogenated copolymer resin in polypropylene becomes very nonuniform, which leads to high susceptibility to fluctuation in extrusion, lowers the appearance of molded articles and makes it impossible to stably prepare a satisfactory product. In the present invention, the softening point is particularly preferably 165° to 200° C.

Use of the hydrogenated copolymer resin is preferred because it is superior to the unhydrogenated copolymer resin in compatibility with polypropylene and hue and surface gloss of the molded article. In this case, a hydrogenated copolymer resin having a maximum absorbance (as an index of hydrogenation of the copolymer resin) of 0.01 to 0.5 is particularly preferred because it is excellent in the compatibility with polypropylene, enables a homogeneous product to be stably prepared, and is excellent in whiteness as well as in opacity.

Even when the maximum absorbance exceeds 0.5, the light shielding property, opacity, etc. can be imparted. However, in this case, the degree of hydrogenation often becomes insufficient, the compatibility with polypropylene is lowered, and there is a feeling of nonuniformity, i.e., the homogeneity is poor. On the other hand, when the hydrogenation is allowed to proceed to a maximum absorbance of less than 0.01, the opacity becomes insufficient. A resin having a high softening point of 200° C. or higher is unfavorable from the viewpoint of cost since a long period of time is required for the hydrogenation reaction.

The term "maximum absorbance" used in the present invention is intended to mean the maximum value of the absorbance at 265 to 276 nm of an ultraviolet absorption spectrum of a sample measured by making use of a spectrophotometer. The higher the degree of hydrogenation, the lower the maximum absorbance.

The composition containing a copolymer resin of the present invention is prepared by blending 100 parts by weight of a crystalline polypropylene with 3 to 40 parts by weight of the copolymer resin of the present invention. When the amount of the copolymer resin is less than 3 parts by weight, the effect of imparting the feeling of opacity, yielding property and the like attempted in the present invention is insufficient. On the other hand, when the amount exceeds 40 parts by weight, the productivity is reduced considerably due to high susceptibility to occurrence of nonuniform extrusion and breaking by stretching. The amount is particularly preferably 5 to 25 parts by weight for the purpose of preparing a thin stretched molded product having excellent yielding property, pearly feeling and the like with high productivity.

If necessary, the above-described composition of the present invention may be added to various other conventional additives commonly used for addition to polypropylene, i.e., processing stabilizers, antioxidants, lubricants, slipping agents, antistatic agents, inorganic fillers, various other polymers, etc.

The above-described composition may be easily prepared by melt kneading in a usual blender, mixer or the like. However, it is particularly preferred that the composition be prepared by melt kneading in an extruder, a Banbury mixer or the like and used in the form of pellets. Further, it is also useful to employ a method which comprises adding a large amount of the copolymer resin of the present invention to a crystalline polypropylene or other resin to prepare a master batch and blending a specific amount of the master batch with a crystalline polypropylene to prepare a mixed composition.

The above-described composition may be molded into films, ribbons, containers, etc. by conventionally known methods. However, uniaxial or biaxial stretching a molded product of the composition is preferred because it is possible to attain a further improvement in the opacity, pearly feeling and light-shielding property of stretched molded product attempted in the present invention. In this case, the stretching process and stretching ratio are the same as those in the case of the above-described composition containing a cyclopentadiene petroleum resin.

Stretched and molded products, such as films, yarns, tapes, ribbons, filaments and hollow containers prepared by stretching blow molding, obtained in the present invention are useful for a wide variety of applications, such as general packaging materials, decorative materials, synthetic paper, packing materials and weaving yarns, by taking advantage of the feeling of opacity, light-shielding property, decrease in the weight and unique pearly gloss.

The opacifying agent used in the present invention is a resin and can be subjected to melt kneading. Therefore, it can be homogeneously dispersed, is free from problems on the preparation of the composition, such as poor dispersion and nonuniform foaming and the like, can be subjected to the same stretching molding as that of polypropylene per se, and eliminates the necessity of providing the step of a special post treatment. Therefore, the process of the present invention as well is very advantageous from the viewpoint of industry.

EXAMPLES

The present invention will now be described in more detail by way of the following examples. However, the present invention is not limited to these examples only. The characteristic values used in the following examples and comparative examples were evaluated by the following methods.

(1) Softening point (ring and ball method): It was measured according to JIS K 2207. When the softening point is 140° C. or above, the measurement was conducted in a silicone oil bath. (Unit:°C.)

(2) Iodine value: It was measured according to JIS K 0070-1966. The iodine value is the number of grams of iodine added to an unsaturated component contained in 100 g of a sample.

(3) Density: It was determined by measuring the weight per $m^2$ of the molded product, converting the weight into a value per $cm^2$ and dividing the value by the thickness (cm). (Unit: $g/cm^3$)

(4) Total light transmittance: It was measured according to JIS K 6714.

(5) Haze: It was measured according to ASTM D1003. (Unit: %)

(6) MFR (melt flow rate): It was measured under testing condition 14 (230° C., 2.16 kgf) specified in JIS K 7210-1976. (Unit: g/10 min)

(7) Tensile strength: It was measured according to ASTM D882. (Unit: $kg/mm^2$)

(8) Ultraviolet absorption spectrum: It was measured by dissolving 0.1 g of a copolymer resin in 100 ml of methylcyclohexane for spectroscopy.

EXAMPLES 1 TO 8

0.1 part by weight of a phenolic antioxidant BHT, 0.1 part by weight of calcium stearate and a cyclopentadiene petroleum resin or its hydrogenated product in an amount as shown in Table 1 were added to 100 parts by weight of a crystalline polypropylene powder having a MFR of 1.5 and a n heptane insoluble content of 92% by weight, and mixed by means of a Henschel mixer (trade name). The mixture was passed through an extruder to conduct melt-kneading at 240° C., cooled and cut to prepare a composition in a pellet form. The resultant composition was melt-extruded at a temperature of 250° C. by means of an extruder having a diameter of 40 mm and a T die having a width of 30 cm. The extrudate was quenched by means of a specular cooling roll kept at 45° C., thereby preparing a non-stretched raw sheet having a thickness of 1.1 mm. The density of the raw sheet thus prepared is shown in Table 1. The raw sheet was cut into a square, preheated at a temperature of 155° C. for 70 sec with a pantagraph biaxial stretching machine, stretched at the same temperature simultaneously in two directions, i.e., longitudinal and lateral directions, to each 5.2 times and heat-treated at the same temperature for 15 sec while stretching, thereby preparing eight biaxially stretched films each having a thickness of about 40 μm. The characteristic values of the resultant films are also shown in Table 1.

The cyclopentadiene petroleum resin was prepared by polymerizing cyclopentadiene or a dicyclopentadiene compound obtained through steam cracking of naphtha according to the conventional method. The hydrogenation was conducted by using a nickel-based catalyst at a temperature of 250° C. under a hydrogen pressure of 80 kg/cm$^2$.

As is apparent from Table 1, the films of Examples 1 to 8 according to the present invention had a high haze value, a low total light transmittance, a density remarkably lower than that of the raw sheet, many fine cells formed within the films, opacity and unique pearly gloss.

COMPARATIVE EXAMPLES 1 TO 5

Treatment of a crystalline polypropylene compositions was conducted under the same condition as that of Examples 1 to 8, except that no cyclopentadiene petroleum resin was added (Comparative Example 1) and the cyclopentadiene petroleum resin blended had a softening point below 160° C. (Comparative Examples 2 to 5). The results are shown in Table 1. As is apparent from Table 1, the films thus prepared are transparent and have a high density. In other words, the thus obtained stretched films do not have opacity attempted in the present invention and provide films are utterly different from films attempted in the present invention.

COMPARATIVE EXAMPLE 6

0.10 part by weight of a phenolic antioxidant (Irganox 1010; a product of Ciba Geigy Limited), 0.05 part by weight of a phosphoric antioxidant (Mark PEP-Q; a product of Adeka Argus Chemical Co., Ltd.), 0.1 part by weight of calcium stearate, 0.12 part by weight of erucic amide and 15 parts by weight of a hydrogenated dicyclopentadiene petroleum resin powder having a softening point (as measured according to the ring and ball method) of 176° C. and an iodine value of 8 were added to 100 parts by weight of a crystalline polypropylene powder having a MFR of 4.0 and a n-heptane insoluble content of 93% by weight, and mixed by means of a Henschel mixer (trade name). The mixture was then subjected to melt kneading at 220° C. for 2 min by making use of a unidirectional twin screw extruder, cooled and cut to prepare a composition in pellet form.

The resultant composition was melt-extruded at 230° C. by making use of a single screw extruder having a bore diameter of 65 mmϕ and a T die having an effective width of 600 mm, cooled by means of a cooling roll having a roughened surface and kept at 25° C., and taken up at a speed of 30 m/min to prepare a non stretched film having a width of 400 mm and a thickness of 30 μm.

The non-stretched film thus prepared had a density of 0.90, a haze of 5.5 and a total light transmittance of 88%. That is, the film was a transparent one through which an object could be seen although it was slightly cloudy. This demonstrates that the non-stretched film cannot be opacified.

TABLE 1

| Ex. or Comp. Ex. | Cyclopentadiene petroleum resin or its hydrogenated product | | | | Raw sheet | Characteristic value of stretched film | | |
|---|---|---|---|---|---|---|---|---|
| | softening point (°C.) | hydro-genation | iodine value | amount of addition (pts. wt.) | density (g/cm$^3$) | haze (%) | density (g/cm3) | total light transmittance (%) |
| Ex. 1 | 165 | yes | 12 | 20.0 | 0.92 | 93.0 | 0.75 | 33 |
| Ex. 2 | 175 | yes | 10 | 5.0 | 0.91 | 80.0 | 0.82 | 47 |
| Ex. 3 | 175 | yes | 10 | 10.0 | 0.92 | 92.4 | 0.75 | 25 |
| Ex. 4 | 175 | yes | 10 | 20.0 | 0.92 | 95.8 | 0.60 | 16 |
| Ex. 5 | 188 | yes | 15 | 20.0 | 0.92 | 96.6 | 0.57 | 13 |
| Ex. 6 | 192 | yes | 8 | 10.0 | 0.91 | 93.5 | 0.72 | 21 |
| Ex. 7 | 170 | no | 203 | 10.0 | 0.91 | 93.0 | 0.79 | 23 |
| Ex. 8 | 185 | no | 210 | 10.0 | 0.91 | 94.6 | 0.76 | 21 |
| Comp. Ex. 1 | — | — | — | 0.0 | 0.91 | 1.8 | 0.91 | 96 |
| Comp. Ex. 2 | 100 | yes | 5 | 20.0 | 0.92 | 1.0 | 0.92 | 97 |
| Comp. Ex. 3 | 120 | yes | 7 | 20.0 | 0.92 | 0.8 | 0.92 | 97 |
| Comp. Ex. 4 | 140 | yes | 7 | 20.0 | 0.92 | 1.0 | 0.92 | 96 |
| Comp. Ex. 5 | 120 | no | 200 | 10.0 | 0.91 | 9.5 | 0.91 | 90 |

EXAMPLE 9

Melt extrusion of the same composition as that used in Comparative Example 6 was conducted by means of a single screw extruder having a bore diameter of 65 mmϕ and a T die having an effective width of 300 mm and quenched by means of a specular cooling roll kept at 25° C. to prepare a raw sheet having a thickness of 0.15 mm and a density of 0.91. The raw sheet thus prepared was preheated by means of four preheating rolls having a diameter of 300 mmϕ and kept at 120° C., longitudinally stretched to 5.2 times by a nip roll kept at the same temperature, heat-treated in a hot-air tank of 140° C. while relaxing by about 3%, and quenched by means of a cooling roll of 30° C. to prepare a monoaxially stretched film having a thickness of 30 μm.

The resultant monoaxially stretched film had a density of 0.78, a haze of 92% and a total light transmittance of 25% and was an opaque beautiful film having a pearly gloss.

and are different from the films attempted in the present invention.

TABLE 2

| Ex. of Comp. Ex. | Copolymer resin or its hydrogenated product | | | | | Characteristics value of stretched film | | |
|---|---|---|---|---|---|---|---|---|
| | copolymer composition {CPD/C9} (wt. ratio) | hydro-genation | softening point (°C.) | maximum absorbance | amount of addition (pts. wt.) | haze (%) | density (g/cm3) | total light transmittance (%) |
| Ex. 10 | 75/25 | yes | 171 | 0.13 | 10 | 90.5 | 0.78 | 30 |
| Ex. 11 | 75/25 | yes | 171 | 0.13 | 20 | 93.5 | 0.60 | 18 |
| Ex. 12 | 75/25 | yes | 171 | 0.13 | 30 | 95.5 | 0.55 | 13 |
| Ex. 13 | 80/20 | yes | 165 | 0.33 | 20 | 91.2 | 0.78 | 40 |
| Ex. 14 | 88/12 | yes | 188 | 0.14 | 20 | 97.0 | 0.52 | 12 |
| Ex. 15 | 88/12 | yes | 188 | 0.14 | 5 | 88.0 | 0.81 | 52 |
| Ex. 16 | 80/20 | yes | 160 | 0.40 | 3 | 80.0 | 0.85 | 55 |
| Ex. 17 | 80/20 | no | 200 | 9.0 | 40 | 96.0 | 0.50 | 12 |
| Ex. 18 | 70/30 | no | 250 | 8.5 | 25 | 90.0 | 0.60 | 15 |
| Comp. Ex. 7 | 75/25 | yes | 125 | 0.05 | 20 | 1.0 | 0.91 | 98 |
| Comp. Ex. 8 | 75/25 | yes | 140 | 0.08 | 45 | 1.2 | 0.91 | 97 |
| Comp. Ex. 9 | 88/12 | yes | 188 | 0.14 | 1 | 12.3 | 0.90 | 88 |
| Comp. Ex. 10 | 75/25 | no | 140 | 7.1 | 20 | 7.5 | 0.91 | 90 |
| Comp. Ex. 11 | 75/25 | yes | 155 | 0.15 | 20 | 9.1 | 0.89 | 89 |
| Comp. Ex. 12 | — | — | — | — | 0 | 1.3 | 0.91 | 97 |

EXAMPLES 10 TO 18 AND COMPARATIVE EXAMPLES 7 TO 12

0.1 part by weight of a phenolic antioxidant, 0.1 part by weight of calcium stearate and a copolymer resin composed of a copolymer of a cyclopentadiene compound with an aromatic hydrocarbon or its hydrogenated product in an amount as shown in Table 2 were added to 100 parts by weight of a crystalline polypropylene powder having a MFR of 2.2 and a n-heptane insoluble content of 93% by weight, and mixed by means of a henschel mixer (trade name). The mixture was passed through an extruder to conduct melt.kneading at 230° C., cooled and cut to prepare 14 compositions in a pellet form. The resultant compositions were melt-extruded at a resin temperature of 250° C. by means of an extruder having a diameter of 40 mm and a T die. The extrudates were quenched by means of a cooling roll kept at 40° C., thereby preparing non-stretched raw sheets having a thickness of 1 mm. Then, the raw sheets were cut into a square, the resulting square raw sheets were preheated at a temperature of 155° C. with a pantagraph biaxial stretching machine, and stretched to 5.2 times the original length at the same temperature simultaneously in two directions, i.e., longitudinal and lateral directions, and heat-treated at the same temperature for 15 sec while stretching, thereby preparing 14 biaxially stretched films each having a thickness of about 40 μm.

The characteristic values of the resultant films are also shown in Table 2.

As is apparent from Table 2, the films of Examples 10 to 18 prepared by using the composition of the present invention had a high haze value, a low total light transmittance, very excellent opacity and light-shielding property, a very low density, and a unique pearly gloss due to formation of many fine cells within the films. Whereas, in the case of Comparative Examples 7 to 11 which contain copolymers which fall outside the scope of the present invention as well as in the case of Comparative Example 12 wherein no copolymer resin of the present composition is added, the same behavior as in the case of the conventional hydrogenated petroleum resin is exhibited. Further, the stretched films obtained in Comparative Examples improve or slightly lower the transparency and bring about no change in the density, i.e., have neither opacity nor light-shielding property,

What is claimed is:

1. An opacified, stretched molded product having a composition comprising 3 to 40 parts by weight of at least one of a cyclopentadiene petroleum resin and a hydrogenated cyclopentadiene petroleum resin having a softening point of 160° C. or higher as measured according to the ring and ball method, and 100 parts by weight of a crystalline polypropylene, said molded product being a product stretched in at least one direction, and having a total light transmittance of 50% or less and a density of 0.89 g/cm$^3$ or less.

2. An opacified, stretched molded product according to claim 1, wherein said hydrogenated cyclopentadiene petroleum resin has a softening point of 170° to 200° C., as measured according to the ring and ball method and is blended in an amount of 5 to 30 parts by weight with 100 parts by weight of a crystalline polypropylene.

3. A crystalline polypropylene resin composition comprising 100 parts by weight of a crystalline polypropylene and 3 to 40 parts by weight of at least one of a copolymer resin of a cyclopentadiene compound and an aromatic hydrocarbon and (b) its hydrogenated product, wherein said copolymer resin and its hydrogenated product have a softening point of 160° to 250° C. as measured according to the ring and ball method.

4. A crystalline polypropylene resin composition according to claim 3, wherein the hydrogenated product of said copolymer resin has a softening point of 165° to 200° C. as measured according to the ring and ball method and an ultraviolet absorption spectrum thereof has a maximum absorbance of 0.01 to 0.5 at 265 to 276 nm.

5. An opacified, stretched molded product having a crystalline polypropylene resin composition comprising 100 parts by weight of a crystalline polypropylene and 3 to 40 parts by weight of at least one of (a) a copolymer resin of a cyclopentadiene compound and an aromatic hydrocarbon and (b) a hydrogenated product of said copolymer resin, said copolymer resin and its hydrogenated product having a softening point of 160° to 250° C. as measured according to the ring and ball method.

6. An opacified, stretched molded product according to claim 5, wherein the hydrogenated product of said copolymer resin contained in said polypropylene resin composition is stretched in at least one direction and has a softening point of 165° to 200° C. as measured according to the ring and ball method and an ultraviolet absorption spectrum thereof has a maximum absorbance of 0.01 to 0.5 at 265 to 276 nm.

7. An opacified, stretched molded product having a composition comprising 3 to 40 parts by weight of a cyclopentadiene petroleum resin having a softening point of 160° C. or higher as measured according to the ring and ball method, and 100 parts by weight of a crystalline polypropylene, said molded product being a product stretched in at least one direction, and having a total light transmittance of 50% or less and a density of 0.89 g/cm$^3$ or less.

8. An opacified, stretched molded product having a crystalline polypropylene resin composition comprising 100 parts by weight of a crystalline polypropylene and 3 to 40 parts by weight of a copolymer resin of a cyclopentadiene compound and an aromatic hydrocarbon, said copolymer resin having a softening point of 160° to 250° C. as measured according to the ring and ball method.

9. An opacified, stretched molded product according to claim 1 wherein said stretched molded product has a haze value of at least 80%.

10. An opacified, stretched molded product according to claim 5 wherein said stretched molded product has a haze value of at least 80%.

11. An opacified, stretched molded product according to claim 7 wherein said stretched molded product has a haze value of at least 80%.

12. An opacified, stretched molded product according to claim 8 wherein said stretched molded product has a haze value of at least 80%.

* * * * *

UNITED STATES PATENT AND TRADEMARK OFFICE
CERTIFICATE OF CORRECTION

PATENT NO. : 5,082,900
DATED : JANUARY 21, 1992
INVENTOR(S) : KURODA ET AL.

It is certified that error appears in the above-identified patent and that said Letters Patent is hereby corrected as shown below:

Claim 3, column 12, line 41, before "a" add --(a)--.

Signed and Sealed this

First Day of June, 1993

Attest:

MICHAEL K. KIRK

Attesting Officer     Acting Commissioner of Patents and Trademarks